United States Patent [19]

Mayer et al.

[11] 4,093,592

[45] June 6, 1978

[54] NOVEL PHENOLIC ANTIOXIDANTS, THEIR PREPARATION AND THEIR USE

[75] Inventors: Norbert Mayer, Gersthofen; Gerhard Pfahler, Augsburg; Hartmut Wiezer, Gersthofen, all of Germany

[73] Assignee: Hoechst Aktiengesellschaft, Frankfurt am Main, Germany

[21] Appl. No.: 778,706

[22] Filed: Mar. 17, 1977

[30] Foreign Application Priority Data

Mar. 23, 1976 Germany ............................ 2612214

[51] Int. Cl.$^2$ ..................... C07C 69/76; C08K 9/00
[52] U.S. Cl. ............................ 260/45.85 B; 560/57
[58] Field of Search ............ 260/473 R, 520 B, 520 E, 260/514 M, 514 G, 45.85 B; 560/57

[56] References Cited

U.S. PATENT DOCUMENTS

| | | | |
|---|---|---|---|
| 3,631,148 | 12/1971 | Krueger | 260/45.95 B |
| 3,996,194 | 12/1976 | Gencarelli et al. | 260/45.85 S |

FOREIGN PATENT DOCUMENTS

2,503,050  8/1975  Germany.

OTHER PUBLICATIONS

Journal of A.C.S., vol. LXVI, Jul.–Dec., 1944, pp. 1768 to 1770.
Journal of A.C.S., vol. LXVII, Jan. 8, 1945, pp. 233 to 237.
Berichte, 1936, pp. 1494 to 1499.

*Primary Examiner*—V. P. Hoke
*Attorney, Agent, or Firm*—Connolly and Hutz

[57] ABSTRACT

2,2-bis-(alkyl-4'-hydroxyphenyl)-cycloalkyl-(alkyl) carbonic acid esters are prepared by condensation of alkyl phenols with 2-keto-cycloalkyl carbonic acid esters in the presence of acidic catalysts and optionally of mercapto derivatives. The product are useful for the stabilization of polymers against the decomposition by light and heat.

5 Claims, No Drawings

NOVEL PHENOLIC ANTIOXIDANTS, THEIR PREPARATION AND THEIR USE

Phenolic compounds alkyl-substituted in ortho position have been added for a long time to organic polymers prior to being processed, to improve their heat and light stability.

It has now been found that the 2,2-bis-(alkyl-4'-hydroxy-phenyl)-cycloalkyl-(alkyl)-carboxylic acid esters of the following formula (I), which have not been disclosed hitherto, are excellently suitable for the stabilisation of organic polymers against the decomposition provoked by heat and by light:

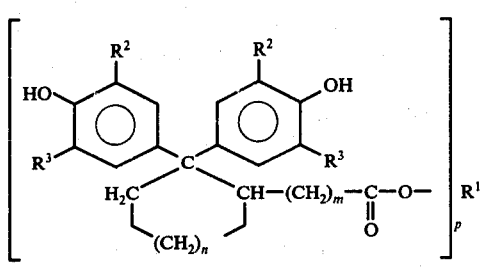

In the above formula m is 0, 1 or 2,
n is an integer of from 2 to 9 and
p is 1, 2, 3 or 4,
$R^1$ is an alkyl or isoalkyl group with up to 30 carbon atoms, the valency of which corresponds to the meaning of p in each case, or a mono- or bivalent, optionally alkyl-substituted cycloalkyl radical having of from 5 to 12 ring carbon atoms, or a monovalent alkene or alkine radical having of from 3 to 30 carbon atoms,
$R^2$ is an alkyl or isoalkyl radical having up to 4 carbon atoms and
$R^3$ is hydrogen or an alkyl or isoalkyl radical having up to 4 carbon atoms.

Preferred compounds in accordance with the present invention, for the above purpose are those wherein p is 1 or 2, especially 1, m is 0, 1 or 2, especially 2, n is 2 or 3, especially 3 and $R^1$ is an n-alkyl radical having from 1 to 20, especially of from 1 to 18 carbon atoms, $R^2$ is an isopropyl group or especially a tert. butyl group and $R^3$ is an isopropyl group or especially hydrogen or a tert. butyl group.

If $R^1$ stands for a cyclic radical having of from 5 to 12 ring carbon atoms, it may be substituted by 1 or 2 alkyl or isoalkyl groups having of from 1 to 12 or of from 3 to 12 carbon atoms. Unsubstituted cycloalkyl radicals are used preferably. Further examples of $R^1$ are radicals of aliphatic mono-, di-, tri- and tetraalcohols, for example methanol, ethanol, butanol, isobutanol, n-hexanol, 2-ethyl-hexanol, octadecanol, ethylene glycol, propylene glycol-1,3, butanediol-1,4, trimethylol propane and pentaerylthritol. Suitable cyclic radicals are, for example cyclohexanol radicals, methylcyclohexanol radicals, cyclopentanol radicals and cyclohexanediol radicals.

The phenolic antioxidants in accordance with the present invention can be prepared in a high yield by condensation of alkylphenols with 2-keto-cycloalkyl-carboxylic acid esters, 2-keto-cycloalkylacetic acid esters and 2-keto-cycloalkylpropionic acid esters, in the presence of acid catalysts and optionally mercapto compounds. The reaction course of the process according to the invention will be illustrated using by way of example, as reactants, 2-keto-cyclohexanepropionic acid ethyl ester and o-tert.butylphenol:

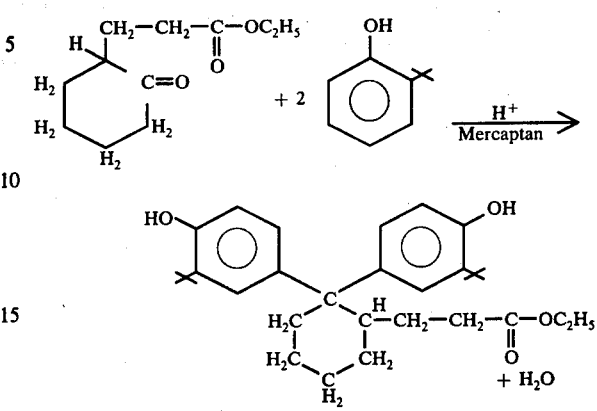

The 2-keto-cycloalkylfatty acid esters used as the starting compounds may be obtained according to processes, which have been described in the literature. 2-Keto-cycloalkylcarboxylic acid esters may be obtained, for example, by intramolecular condensation of long chain dicarboxylic acid esters or by the reaction of cycloalkanones with oxalic acid esters and by subsequent decarbonylation. They may moreover be obtained from cycloalkanones and carbonic acid dialkyl esters or from α-chlorocycloalkanones and KCN and by subsequent saponification [Cf. Levine, Hauser, Am.-Soc. 66 (1944), page 1768]. 2-Keto-cycloalkylacetic acid esters may be prepared according to Newman and van der Werf, Am.Soc. 67, (1945), page 233 and 236, and 2-keto-cycloalkylpropionic acid esters, may be obtained for example by addition of acrylic acid esters to cyclic ketones [Cf. Chuang, Tien, Ma, Ber. 69 (1936), pages 1494 and 1499]. Suitable 2-keto-cycloalkyl fatty acid esters, are, for example, 2-keto-cyclohexanepropionic acid isopropyl esters, cyclopentanone-2-carboxylic acid methyl esters, 2-keto-cyclohexanecarboxylic acid ethyl esters, 2-keto-cyclo-hexanecarboxylic acid-bis-ethylene-glycol esters and 2-keto-cyclohexane-carboxylic acid cyclohexyl esters.

Suitable phenols are alkylphenols unsubstituted in the 4 position, preferably 2-alkylphenols and 2,6-dialkylphenols, the alkyl radicals of which have up to 4 carbon atoms and may be straight chain or branched. Less suitable are alkylphenols substituted in the 1,6 position by two tertiary butyl groups or by one tertiary butyl group and one isopropyl group. Suitable phenols are, for example, 2,6-dimethylphenol, 2-methyl-6-tert.butylphenol, 2,6-diisopropylphenol and preferably 2-tert.butylphenol.

When condensing 2-keto-cyclohexanefatty acid ester with alkylphenol, the latter is preferably used in an excess; the condensation may moreover be carried out in the presence of solvents such as toluene, benzene, ethanol or acetic acid esters, which do not interfere with the reaction. The reaction temperatures are in the range of from 0 to about 100, preferably of from +5° to +15° C.

In products which have been obtained from a phenol alkyl-substituted in only one ortho position with regard to the OH group there may be introduced additionally an alkyl group in both phenyl nuclei, in the second ortho position, by adding olefins, for example propene and especially isobutene, in the presence of aromatic solvents, for example toluene or ethyl-benzene, as well as of Friedel-Crafts catalysts, for example protonic acids, preferably $H_2SO_4$ and especially p-toluenesulfonic acid (Cf. German Offenlegungsschrift No. 2,503,050). Thus it is possible to prepare di-tert.butyl and tert.butylisopropyl substitution products, which may be obtained from the corresponding phenols only in extremely difficult manner. These compounds are distinguished by the fact that they confer upon plastics compositions a high color stability, when being used therein as antioxidants.

The esters according to the present invention may furthermore be obtained by esterification from the acids from which they derive according to known methods, for example by reacting the alkali metal salts with halogenoalkylene.

An especial advantage of the compounds according to the invention resides in their cyclic structure, owing to which they have a higher stability, as compare to open-chain antioxidants, against thermal fragmentation and fragmentation caused by oxidation, when being incorporated into plastics compositions. In the case of open-chain molecules, the breaking up to one chemical bond may result in the cleavage of a volatile, odorous cleavage product, whereas two chemical bonds have to be broken up in a carbocyclus to obtain a cleavage product.

The phenolic antioxidant are suitable for the stabilization of synthetic polymers, preferably polyolefins, for example polystyrene, polyacrylates and polymetharylates and especially of polyethylene and polypropylene. They are used thereby in an amount of from 0.001 to 5.0, preferably of from 0.01 to 1% by weight, calculated on the polymer. Products wherein the cycloalkyl ring has alkyl groups are also suitable.

Suitable costabilizers are sulfidic antioxidants, for example lauryl- or stearyl thiopropionate or dioctadecyl sulfide or dioctadecyl disulfide combined with calcium stearate. Suitable phosphorous-containing stabilizers are, for example disstearyl pentaerythrityl diphosphite, esters of pentaerythritol, trisstearyl phosphite and others. In some cases it is advisable phenolic antioxidants in addition to said costabilizers in admixture with light stabilizers. Examples of the latter are oxybenzophenones, benzotriazoles or the highly efficient piperidine stabilizers, which have been disclosed recently.

The following examples illustrate the invention:

EXAMPLE 1

2,2-Bis-(3'-tert.butyl-4'-hydroxyphenyl)-cyclohexane-propionic acid isopropyl ester Dry gaseous HCl is passed while stirring at 5° C, for a period of 16 hours, through a mixture of 103.5 g (0.5 mol) of 2-keto-cyclohexanepropionic acid isopropyl ester, 600 g (4 mols) of o-tert.butylphenol and 32 ml of n-dodecylmercaptan. When condensation is complete, the reaction water, the excess of o-tert.butylphenol serving as a solvent as well as dodecylmercaptan serving as a catalyst are distilled off in the water jet vacuum at a final bath temperature of 180° C. The residue in the flask is then taken up in 700 ml of toluene and the product obtained is crystallized completely in a freezing box at a temperature of $-12°$ C. The crystals filtered off are again recrystallized from toluene. 165 g (67% of the theory) of the above product are obtained having a melting point of 172° C.

$C_{32}H_{46}O_4$ (molecular weight 494): C calculated: 77.7%: H calculated: 9.3%: C found: 78.1%: H calculated: 9.5%.

EXAMPLE 2

2,2-Bis-(3',5'-di-tert.butyl-4'-hydroxyphenyl)-cyclohexane-propionic acid isopropyl ester 50 g (about 0.1 mol) of the compound obtained according to Example 1 are dissolved in 75 ml of toluene. 5 g of p-toluene-sulfonic acid are added and gaseous isobutene is introduced while stirring at 70° C for a period of 16 hours. After cooling to room temperature the reaction mixture is mixed with ether and shaken out with aqueous alkali hydroxide solution. The organic phase is concentrated and the residue is recrystallized twice from toluene by precipitation with heptane. Yield 45.5 g, which corresponds to 75% of the theory. The product has a melting point of from 162° to 165° C.

$C_{40}H_{62}O_4$ (molecular weight 606): C calculated: 79.2%: H calculated: 10.2%: C found: 79.0%: H found: 9.9%.

EXAMPLE 3

2,2-Bis-(3'-tert.butyl-4'-hydroxyphenyl)-cyclopentanecarboxylic acid methyl ester As described in Example 1, a mixture of 72 g (0.5 mol) of cyclopentanecarboxylic acid methyl ester, 600 g (4 mols) of o-tert.butylphenol and 32 ml of n-dodecylmercaptan are condensed and worked up. 138 g of the above ester were obtained, which corresponds to 65% of the theory. Melting point 140° C.

$C_{27}H_{36}O_4$ (molecular weight 424): C calculated: 76.4%: H calculated: 8.5%: C found: 76.1%: H found: 8.6%.

EXAMPLE 4

2,2-Bis-(3',5'-di-tert.butyl-4'-hydroxyphenyl)-cyclopentane-carboxylic acid methyl ester 50 g (0.118 mol) of the product obtained according Example 3 are alkylated in the presence of 75 ml of toluene and 5 g of p-toluene-sulfonic acid, with isobutene, according to the process described in Example 2. The reaction mixture is neutralized with aqueous sodium hydroxide solution, concentrated and taken up in heptane. The desired product crystallizes from heptane and, after a further recrystallization from heptane, it is obtained in a yield of 47 g, with corresponds to 74% of the theory. Melting point of from 113° to 115° C $C_{35}H_{52}O_4$ (molecular weight 536): C calculated: 78.4%: H found: 9.7%: C found: 78.4%: H found: 10.0%.

EXAMPLE 5

2,2-Bis-(3'-tert.butyl-4'-hydroxyphenyl)-cyclohexanecarboxylic acid ethyl ester

Gaseous HCl is introduced at a temperature of from 5 to 10° C for a period of 12 hours into a mixture of 86 g (0.5 mol) of 2-keto-cyclohexanecarboxylic acid ethyl ester, 300 g (2 mols) of o-tert.butylphenol and 32 ml of n-dodecylmercaptan. The reaction mixture is then worked up as described in Example 1. After having recrystallized twice in toluene the wanted compound is obtained in an amount of 58% of the theory. It has a melting point of 86° C.

$C_{29}H_{40}C_4$ (molecular weight 452): C calculated: 77.0%: H calculated: 8.9%: C calculated: 77.3%: H found: 9.1%.

EXAMPLE 6

2,2-Bis-(3'-tert.butyl-4'-hydroxyphenyl)-cyclohexanepropionic acid octadecyl ester 45.2 g (0.1 mol) of 2,2-bis-(3'-tert.butyl-4'-hydroxyphenyl)-cyclohexanepropionic acid are dissolved in ethanol and neutralizaed with an ethanolic solution of 5.7 g (0.1 mol) of potassium hydroxide. The solution is concentrated nearly to dryness, taken up in 250 ml of toluene and mixed with 33.3 g (0.1 mol) of octadecyl bromide. The batch is refluxed for 3 hours, filtered off from the precipitated KBr and concentrated to about 100 ml. The product precipitated after some time is recrystallized from toluene/heptane. Yield 50 g, which corresponds to 71% of the theory. Melting point 155° C.

$C_{47}H_{76}O_4$ (molecular weight 704): C calculated: 80.1%: H calculated: 10.8%: C found: 79.6%: H found: 10.5%.

EXAMPLE 7

The antioxidative effect of the compounds according to the invention in a polyolefin becomes evident when determining the aging of heat of the plastics composition in the presence or in the absence of said compounds. A mixture of 100 parts by weight of unstabilized polypropylene powder (density 0.96 g/cm³; melt index i₅ about 6 g/10 minutes, determined according to ASTM D 12 38–62 T), 0.5 part by weight of laurine thiopropionic acid ester and 0.2 part by weight of one of the compounds according to the invention is homogenized on a two roller mill at 200° C for 5 minutes. The plastics melt is molded at 200° C to give a plate having a thickness of 1 mm and strip test specimens of 100 × 10 × 1 mm are punched out from the plate obtained.

The test specimens are submitted to a uniform heat treatment at 140° C in a drying cabinet. The end of the test can be seen by the fact that about ⅔ of the surface of each test specimen has crumbled with complete turbidity and discoloration (= "complete embrittlement").

Table

| antioxidant According to Example | complete embrittlement after ... days |
|---|---|
| 1 | 65 |
| 2 | 77 |
| without | 3 |

What is claimed is:

1. 2,2-Bis-(alkyl-4'-hydroxyphenyl)cycloalkyl-(alkyl)-carboxylic acid ester of the formula

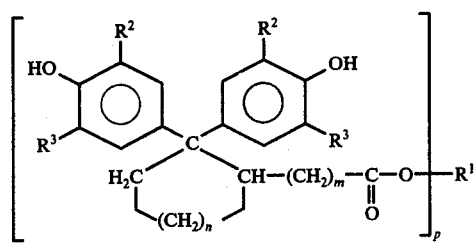

wherein m is 0, 1 or 2, n is an integer of from 2 to 9 and p is 1, 2, 3 or 4, $R^1$ is an alkyl or isoalkyl radical with up to 30 carbon atoms, the valency of which corresponds to the meaning of p in each case, or a mono- or bivalent, optionally alkylsubstituted cycloalkyl radical having of from 5 to 12 ring carbon atoms, or a monovalent alkene or alkyne radical having of from 3 to 30 carbon atoms, $R^2$ is an alkyl or isoalkyl radical having up to 4 carbon atoms and $R^3$ is hydrogen or an alkyl or isoalkyl radical having up to 4 carbon atoms.

2. A process for the preparation of the compounds as claimed in claim 1, except those wherein $R^2$ and $R^3$ stand for tertiary butyl groups or $R^2$ stands for a tertiary butyl group and $R^3$ for an isopropyl group, which comprises condensing cycloalkyl ketones of the formula II with phenols of the formula III,

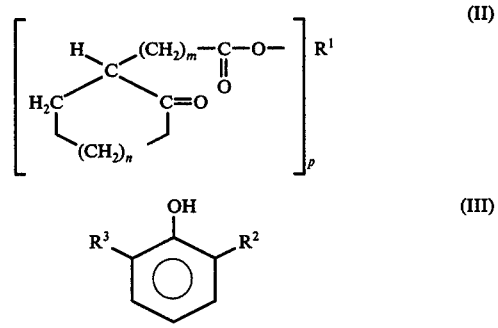

wherein the indices are defined as above, except that $R^2$ and $R^3$ must not stand simultaneously for two tertiary butyl groups or for one tertiary butyl group and one isopropyl group, in the presence of an acid catalyst and optionally in the presence of an organic solvent and/or an alkyl mercaptan, with elimination of water.

3. A process for the preparation of the compounds as claimed in claim 1, wherein $R^3$ stands for a tertiary butyl radical which comprises reacting compounds as claimed in claim 1 wherein $R^3$ is H, in the presence of a protonic acid and an aromatic hydrocarbon as a solvent, with isobutene.

4. A polymer selected from the group consisting of polystyrene, polyacrylates, polymethacrylates, polyethylene and polypropylene being stabilized against the detrimental action of light and heat, by a compound as claimed in claim 1 in an amount of from 0.001 to 5% by weight, calculated on the polymer.

5. A method of stabilizing synthetic polymers against decomposition caused by heat and light, which method comprises adding to the polymers of from 0.001 to 5.0% by weight thereof a 2,2-bis-(alkyl-4'-hydroxyphenyl)-cycloalkyl-(alkyl)-carboxylic acid ester of the formula

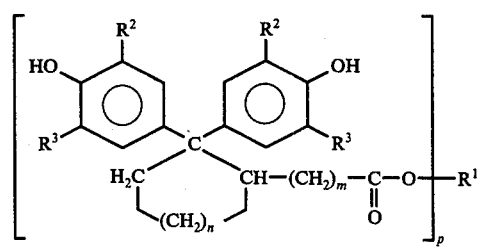

wherein
- $m$ is 0, 1 or 2,
- $n$ is an integer of from 2 to 9 and
- $p$ is 1, 2, 3 or 4,
- $R^1$ is an alkyl or isoalkyl radical with up to 30 carbon atoms, the valency of which corresponds to the meaning of $p$ in each case, or a mono- or bivalent, optionally alkylsubstituted cycloalkyl radical having of from 5 to 12 ring carbon atoms, or a monovalent alkene or alkyne radical having of from 3 tp 30 carbon atoms,
- $R^2$ is an alkyl or isoalkyl radical having up to 4 carbon atoms, and,
- $R^3$ is hydrogen or an alkyl or isoalkyl radical having up to 4 carbon atoms.

* * * * *